(12) United States Patent
Clarens et al.

(10) Patent No.: US 9,873,852 B2
(45) Date of Patent: Jan. 23, 2018

(54) GAS-EXPANDED LUBRICANTS FOR INCREASED ENERGY EFFICIENCY AND RELATED METHOD AND SYSTEM

(75) Inventors: Andres F. Clarens, Charlottesville, VA (US); Paul E. Allaire, Charlottesville, VA (US); Amir Younan, Charlottesville, VA (US); Shibo Wang, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 13/502,066

(22) PCT Filed: Oct. 15, 2010

(86) PCT No.: PCT/US2010/052878
§ 371 (c)(1),
(2), (4) Date: Apr. 16, 2012

(87) PCT Pub. No.: WO2011/047285
PCT Pub. Date: Apr. 21, 2011

(65) Prior Publication Data
US 2012/0199421 A1 Aug. 9, 2012

Related U.S. Application Data

(60) Provisional application No. 61/252,472, filed on Oct. 16, 2009.

(51) Int. Cl.
*F16N 39/00* (2006.01)
*C10M 169/04* (2006.01)
(Continued)

(52) U.S. Cl.
CPC ......... *C10M 169/04* (2013.01); *C10M 111/04* (2013.01); *C10M 171/005* (2013.01);
(Continued)

(58) Field of Classification Search
CPC .............. C10M 169/04; C10M 111/04; C10M 171/005; F16N 7/30; F16N 7/32
(Continued)

(56) References Cited

U.S. PATENT DOCUMENTS 3,510,425 A * 5/1970 Wilson ................. C10M 145/14
508/352
3,674,112 A * 7/1972 Roberts .......................... 184/6.1
(Continued)

FOREIGN PATENT DOCUMENTS

CA 991165 A1 6/1976
DE 102004060479 * 6/2006
(Continued)

OTHER PUBLICATIONS

Angantyr, et al., "Constrained Optimization of Gas Turbine Tilting Pad Bearing Designs," Transactions of the ASME. Journal of Engineering for Gas Turbines and Power, Oct. 2006, pp. 873-878, vol. 128, No. 4.
(Continued)

*Primary Examiner* — Michael A Riegelman
(74) *Attorney, Agent, or Firm* — Robert J. Decker

(57) ABSTRACT

Method and System of lubricating at least one moving part with a medium. The medium includes a dissolved mixture of lubricant and compressed gas. The amount of lubricant and compressed gas may be controlled in forming the dissolved mixture in response to input conditions. A user and/or external factors may be used to determine the input conditions. In response to the input conditions the amount of lubricant and compressed gas is delivered to the moving part that is housed in a pressurized chamber. The properties of the dissolved mixture can be adjusted, whereby the properties may include, but are not limited to, the following: viscosity, temperature, and thermal conductivity. This adjustment to
(Continued)

the gas may be accomplished, for example, by releasing gas from the pressurized chamber in an amount to adjust the properties. In a further approach, lubricant may be scavenged from the pressurized chamber by returning surplus lubricant to its original source or other designated location.

41 Claims, 8 Drawing Sheets

(51) Int. Cl.
  C10M 111/04 (2006.01)
  C10M 171/00 (2006.01)
  F16N 7/30 (2006.01)
  F16N 7/32 (2006.01)
  F16C 33/66 (2006.01)
  F16C 17/03 (2006.01)

(52) U.S. Cl.
  CPC ............ *F16C 33/6662* (2013.01); *F16N 7/30* (2013.01); *F16N 7/32* (2013.01); *C10M 2201/04* (2013.01); *C10M 2201/0403* (2013.01); *C10M 2201/16* (2013.01); *C10M 2203/1006* (2013.01); *C10M 2205/0285* (2013.01); *C10M 2207/2835* (2013.01); *C10M 2209/1033* (2013.01); *C10N 2230/02* (2013.01); *C10N 2230/58* (2013.01); *C10N 2240/02* (2013.01); *C10N 2250/06* (2013.01); *F16C 17/03* (2013.01)

(58) Field of Classification Search
  USPC ................ 184/6.21, 6.11; 508/485, 579, 110
  See application file for complete search history.

(56) References Cited

U.S. PATENT DOCUMENTS

| | | | | |
|---|---|---|---|---|
| 3,706,355 | A | * | 12/1972 | Oglesbee ........................... 184/6 |
| 3,805,918 | A | * | 4/1974 | Altgelt ................ C10M 143/02 184/109 |
| 4,063,855 | A | | 12/1977 | Paul |
| 4,105,093 | A | | 8/1978 | Dickinson |
| 4,205,708 | A | * | 6/1980 | Burgbacher ................... 139/1 R |
| 4,284,174 | A | * | 8/1981 | Salvana et al. ................ 184/6.4 |
| 4,312,424 | A | * | 1/1982 | Taylor et al. .................. 184/6.4 |
| 4,527,661 | A | * | 7/1985 | Johnstone et al. ............. 184/6.1 |
| 4,601,840 | A | * | 7/1986 | Zehler ................ C10M 169/041 184/109 |
| 4,967,881 | A | * | 11/1990 | Meuer et al. .................. 184/7.4 |
| 5,465,810 | A | | 11/1995 | Peterson |
| 5,485,895 | A | | 1/1996 | Peterson |
| 5,626,470 | A | | 5/1997 | Gerhardt |
| 5,756,430 | A | * | 5/1998 | Zielinski .............. C10M 169/04 508/275 |
| 5,806,630 | A | * | 9/1998 | Bernal ........................ 184/6.26 |
| 6,083,887 | A | | 7/2000 | Skold |
| 6,399,550 | B1 | * | 6/2002 | Zehler ................ C10M 111/04 508/501 |
| 6,543,580 | B1 | * | 4/2003 | Gathmann et al. ............ 184/7.4 |
| 6,853,850 | B2 | | 2/2005 | Shim |
| 7,163,086 | B2 | | 1/2007 | Care |
| 7,216,473 | B1 | | 5/2007 | McArthur |
| 7,414,015 | B2 | * | 8/2008 | Skerlos et al. ................ 508/469 |
| 7,499,686 | B2 | | 3/2009 | Sinclair |
| 7,506,724 | B2 | | 3/2009 | Delaloye |
| 7,522,065 | B2 | | 4/2009 | Falcon |
| 7,566,356 | B2 | | 7/2009 | Latulipe |
| 7,644,572 | B2 | | 1/2010 | Labala |
| 8,240,235 | B2 | * | 8/2012 | Suda et al. ........................ 83/22 |
| 9,181,983 | B2 | | 11/2015 | Bayer et al. |
| 2003/0019691 | A1 | | 1/2003 | Matsuura |
| 2004/0112679 | A1 | * | 6/2004 | Centers ................... F04C 18/16 184/7.4 |
| 2006/0054406 | A1 | | 3/2006 | Delaloye |
| 2006/0247139 | A1 | * | 11/2006 | Skerlos et al. ................ 508/154 |
| 2006/0252950 | A1 | | 11/2006 | Ginosar |
| 2008/0026967 | A1 | | 1/2008 | Suda |
| 2008/0293599 | A1 | * | 11/2008 | Skerlos et al. ................ 508/154 |
| 2009/0263059 | A1 | | 10/2009 | Bayer et al. |

FOREIGN PATENT DOCUMENTS

| | | |
|---|---|---|
| EP | 0078421 A2 | 5/1983 |
| EP | 0992572 A2 | 4/2000 |
| EP | 1209357 A1 | 5/2002 |
| WO | 2006/063571 A1 | 6/2006 |

OTHER PUBLICATIONS

Bair, "The High Pressure Rheology of Mixtures," Journal of Tribology, Oct. 2004, pp. 697-702, vol. 126, Iss. 4.

Brechting et al., "Influence of Journal Speed and Load on the Static Operating Characteristics of a Tilting-Pad Journal Bearing with Ball-and-Socket Pivots," Tribology Transactions, 2005, pp. 283-288, vol. 48, No. 3.

Clarens, "Carbon Dioxide Based Metalworking Fluids," Ph.D. thesis, University of Michigan, Ann Arbor, 2008, 179 pages.

Clarens, et al., "Feasibility of Gas-Expanded Lubricants for Increased Energy Efficiency in Tilting-Pad Journal Bearings", Journal of Tribology, Jul. 2010, pp. 031802-1-031802-8, vol. 132, Iss. 3.

Demas et al., "Tribological Studies on Scuffing Due to the Influence of Carbon Dioxide Used as a Refrigerant in Compressors," Tribology Transactions, 2005, pp. 336-342, vol. 48, No. 3.

Fillon et al., "Experimental Study of Tilting-Pad Journal Bearings—Comparison with Theoretical Thermoelastohydrodynamic Results," Journal of Tribology, Jul. 1992, pp. 579-587, vol. 114.

Glavatskih et al., "Influence of Oil Viscosity Grade on Thrust Pad Bearing Operation," Proceedings of the Institution of Mechanical Engineers, Part J: Journal of Engineering Tribology, 2004, pp. 401-412, vol. 218, No. 5.

Harangozo et al., "Effect of Different Lubrication Methods on the Performance of a Tilting-Pad Journal Bearing," Tribology Transactions, 1991, pp. 529-536, vol. 34, No. 4.

Hauk et al., "Thermodynamic and Fluid-Dynamic Properties of Carbon Dioxide with Different Lubricants in Cooling Circuits for Automobile Application," Industrial and Engineering Chemistry Research, 2000, pp. 4646-4651, vol. 39, No. 12.

He, "Thermoelastohydrodynamic Analysis of Fluid Film Journal Bearings," Ph.D. thesis, UVA, Charlottesville, 2003, 256 pages.

He et al., "Thermoelastichydrodynamic Analysis of Journal Bearings with 2d Generalized Energy Equation," IFTOMM, Sixth International Conference on Rotor Dynamics Proceedings—vol. II, 2002, pp. 666-673, Sydney, Australia.

Lihua et al., "Analysis on Dynamic Performance of Hydrodynamic Tilting-Pad Gas Bearings Using Partial Derivative Method," Journal of Tribology, Jan. 2009, pp. 011703-1-011703-8, vol. 131, Iss. 1.

Martin et al., "Plain Journal Bearings Under Steady Loads: Design Guidance for Safe Operations," First European Tribology Congress, 1974, pp. 449-463.

Martin, "Minimum Allowable Oil Film Thickness in Steady Loaded Journal Bearings," Proceedings of the Institution of Mechanical Engineers, Proceedings of the Lubrication and Wear Convention, 1964, pp. 161-167, vol. 178, Part 3N.

Murphy et al., "Synthetics Basics Benefits of Synthetic Lubricants in Industrial," Journal of Synthetic Lubrication, Jan. 2002, pp. 301-325, vol. 18, Iss. 4.

Nicholas, "A Finite Element Dynamic Analysis of Pressure Dam and Tilting Pad Bearings," Ph.D. thesis, University of Virginia, Charlottesville, VA, 1977, 256 pages.

Rimpel et al., "Rotordynamic Performance of Flexure Pivot Tilting Pad Gas Bearings with Vibration Damper," Journal of Tribology, Apr. 2009, pp. 021101-1-021101-12, vol. 131, Iss. 2.

Span et al., "A New Equation of State for Carbon Dioxide Covering the Fluid Region from the Triple-Point Temperature to 1100 K at Pressures up to 800 Mpa," Journal of Physical and Chemical Reference Data, 1996, pp. 1509-1596, vol. 25, No. 6.

(56) References Cited

OTHER PUBLICATIONS

Stadler et al., "Prediction of Co2/Crude Oil Phase Behavior Using Supercritical Fluid Chromatography," Proceedings, SPE/DOE Eight Symposium on Enhanced Oil Recovery, 1992, pp. 71-82, eds., Tulsa, OK, USA.

Taniguchi et al., "Thermohydrodynamic Analysis of Large Tilting-Pad Journal Bearing in Laminar and Turbulent Flow Regimes with Mixing," Journal of Tribology, 1990, pp. 542-550, vol. 112, No. 3.

Taylor et al., "Lubricants & Energy Efficiency: Life-Cycle Analysis," Life Cycle Tribology, Tribology and Interface Engineering Series, 2005, pp. 565-572, vol. 48.

Tuomas et al., "Compressibility of Oil/Refrigerant Lubricants in Elasto-Hydrodynamic Contacts," Journal of Tribology, Jan. 2006, pp. 218-220, vol. 128, Iss. 1.

Yokozeki, "Solubility Correlation and Phase Behaviors of Carbon Dioxide and Lubricant Oil Mixtures," Applied Energy, 2007, pp. 159-175, vol. 84, Iss. 2.

Yuchuan et al., "The Shear-Thinning Elastohydrodynamic Film Thickness of a Two-Component Mixture," Journal of Tribology, Apr. 2008, pp. 021502-1-021502-7, vol. 130, Iss. 2.

\* cited by examiner

GAS-EXPANDED LUBRICANTS FOR INCREASED ENERGY EFFICIENCY AND RELATED METHOD AND SYSTEM

CROSS REFERENCE TO RELATED APPLICATIONS

This application is a national stage filing of International Application No. PCT/US2010/052878, filed Oct. 15, 2010 which claims priority under 35 U.S.C. § 119(e) from U.S. Provisional Application Ser. No. 61/252,472, filed Oct. 16, 2009, entitled "Feasibility of Gas-Expanded Lubricants for Increased Energy Efficiency in Tilting-Pad Journal Bearings and Related Method;" the disclosures of which are hereby incorporated by reference herein in their entirety.

FIELD OF THE INVENTION

The present invention relates generally to the field of lubricants. More particularly, but not exclusively, this invention relates to a composition, method and system for the use of a gas-expanded lubricant in bearings and other moving parts.

BACKGROUND OF THE INVENTION

Lubricants are used in tilting-pad journal bearings to support the weight of the shaft under loaded conditions, to provide suitable stiffness and damping when the bearing is incorporated into a rotor system, and to protect the mechanical components from wear [1-3]. Both the mechanical (e.g., viscosity, density) and thermal (e.g., heat capacity, conductivity) properties of the lubricant are important to ensure proper system function. High viscosity and/or density fluids typically provide more stability and protection for the bearing. A lubricant viscosity that is too high can result in undesirable power losses and unacceptably high pad temperatures [4]. The thermal properties of the lubricant must be selected so that friction in the bearing does not lead to temperature build-up and viscosity changes caused by the degradation of the lubricant. Selecting an application-specific lubricant generally solves this trade-off between bearing stability and bearing efficiency. The result can be a bearing that operates optimally in a narrow window of speeds and loads but is less robust if system conditions change [5].

Volatile oil prices and an increased focus on energy efficiency have driven research in more highly efficient lubricants [6]. Gas-lubricated bearings have been developed recently to accommodate the high shaft speeds needed for clean energy processes [7]. Under high speed and temperature conditions, liquid lubricants can degrade and power losses through the bearing can become significant. Under slight pressure, a gas stream can be delivered to the bearing pad to provide a thin film separating the shaft and the pads. Advances in bearing geometry have helped improve the technical feasibility of such systems. Nevertheless, the lower load capacity and low rotor damping of gas-lubricated bearings when compared to oil-lubricated systems will limit their implementation in the practice [8].

Another way to improve bearing efficiency is to deliver 'tunable' lubricants, or those that can have their properties adjusted dynamically in response to changing loading or speed conditions [9]. This can be achieved by delivering binary mixtures of lubricants to the bearing and controlling the ratio of the mixture [10]. For example, one lubricant might have high viscosity and the other low viscosity and intermediate viscosities can be achieved by mixing the two. In such a system and method, the lubricant properties can be selected to produce conditions best suited for the application. Such systems would not be easily reversible since liquid-liquid separations, can be tricky and often consume more energy than could be saved using a tunable fluid. For this reason, mixtures of liquid lubricants have not been widely adopted.

SUMMARY OF THE INVENTION

Lubricants are necessary in tilting-pad journal bearings to ensure separation between solid surfaces and to dissipate heat. They are also responsible for much of the undesirable power losses that can occur through a bearing. Here, a novel method and system to, but not limited thereto, reduce power losses in tilting-pad journal bearings is proposed in which the lubricant is substituted by a binary mixture of synthetic lubricant and dissolved liquid phase $CO_2$. These gas-expanded lubricants (GELs) would be delivered to a reinforced bearing housing capable of withstanding modest pressures up to about 5 or about 10 MPa. For bearings subject to loads that are both variable and predictable, GELs could be used to adjust lubricant properties in real time, resulting in potentially significant reductions in power loss. High-pressure lubricants, mostly gases, have already been explored in tilting-pad journal bearings as a means to accommodate higher shaft speeds while reducing power losses and eliminating the potential for thermal degradation of the lubricant. Gas-lubricated bearings, however, have intrinsic limitations in terms of bearing size and load capacity. The method and system would combine the loading capabilities of lubricated bearings with the efficiency of gas-lubricated bearings. The liquid or supercritical $CO_2$ serves as a low-viscosity and completely miscible additive to the lubricant that can be easily removed by purging the gas after removing the pressure in the mixture. In this way, the lubricant can be fully recycled, while controlling the lubricant properties in real time by adding liquid $CO_2$. Lubricant properties of interest, such as viscosity, can be easily tuned by controlling the gas pressure inside the bearing housing. Experimental measurements of viscosity for mixtures of polyalkylene glycol (PAG)+$CO_2$ at various compositions demonstrate that significant reductions in mixture viscosity can be achieved with relatively small additions of $CO_2$. The measured parameters are input to a thermoelastichydrodynamic model of tilting-pad journal bearing performance to evaluate the bearing response to these novel fluids. Model estimates of important bearing parameters, including power loss, eccentricity ratio, and pad temperature, suggest that bearings would respond quite favorably to the delivery of a GEL over a range of speed and preload conditions. Power loss reductions of 20% are observed when compared to both a reference petroleum lubricant and PAG without $CO_2$. Pad temperature is also reduced without significant increases in eccentricity ratio. Both power loss and pad temperature are directly correlated with PAG-$CO_2$ composition, which can be easily controlled, suggesting that these mixtures could be used as 'smart' lubricants responsive to system operating conditions.

An aspect of an embodiment of the present invention provides a medium for lubricating at least one moving part, whereby the medium may comprise a dissolved mixture of a lubricant and a compressed gas.

An aspect of an embodiment of the present invention provides a method of lubricating at least one moving part with a medium. The method may comprise: providing the medium to at least one moving part, wherein the medium is comprised of a dissolved mixture of a lubricant and a compressed gas.

An aspect of an embodiment of the present invention provides a system for lubricating at least one moving part with a medium. The system may comprise: a pressurized chamber configured to house at least one moving part; a lubricant reservoir configured to house a lubricant; and a gas reservoir configured to house a gas, wherein the lubricant and the gas are dissolved into a mixture in the pressurized chamber to form the medium.

An aspect of an embodiment of the present invention provides a method and System of lubricating at least one moving part with a medium. The medium includes a dissolved mixture of lubricant and compressed gas. The amount of lubricant and compressed gas may be controlled in forming the dissolved mixture in response to input conditions. A user and/or external factors may be used to determine the input conditions. In response to the input conditions the amount of lubricant and compressed gas is delivered to the moving part that is housed in a pressurized chamber. The properties of the dissolved mixture can be adjusted, whereby the properties may include, but are not limited to, the following: viscosity, temperature, and thermal conductivity. This adjustment to the gas may be accomplished, for example, by releasing gas from the pressurized chamber in an amount to adjust the properties. In a further approach, lubricant may be scavenged from the pressurized chamber by returning surplus lubricant to its original source or other designated location.

These and other objects, along with advantages and features of various aspects of embodiments of the invention disclosed herein, will be made more apparent from the description, drawings and claims that follow.

BRIEF DESCRIPTION OF THE DRAWINGS

The accompanying drawings, which are incorporated into and form a part of the instant specification, illustrate several aspects and embodiments of the present invention and, together with the description herein, serve to explain the principles of the invention. The drawings are provided only for the purpose of illustrating select embodiments of the invention and are not to be construed as limiting the invention.

DETAILED DESCRIPTION OF THE INVENTION

In the chemicals sector, smart solvents are being designed using gas-expanded fluids (GXLs). A GXL is a binary mixture of a solvent, usually organic, and an industrial gas, most often CO2. The media is liquid but the composition can be controlled so that it has properties between those of a pure solvent and a gas. The mixture is maintained at intermediate pressures (~1 MPa) when compared to high-pressure supercritical fluids, which are maintained at (~10 MPa) [11]. The presence of gas in the mixture enhances mass transfer relative to the straight solvents. GXLs also consume less solvent, which often has significant environmental or occupational health burdens, and replace it with dense liquid CO2, a largely inert byproduct of numerous industrial processes. When the presence of gas is no longer desirable, it can be separated easily by dropping the pressure of the mixture and venting the gas. Though GXLs are being actively investigated, this research has been focused on chemical applications and little effort has been made to explore the analogous concept in lubricant systems.

Figure 1:
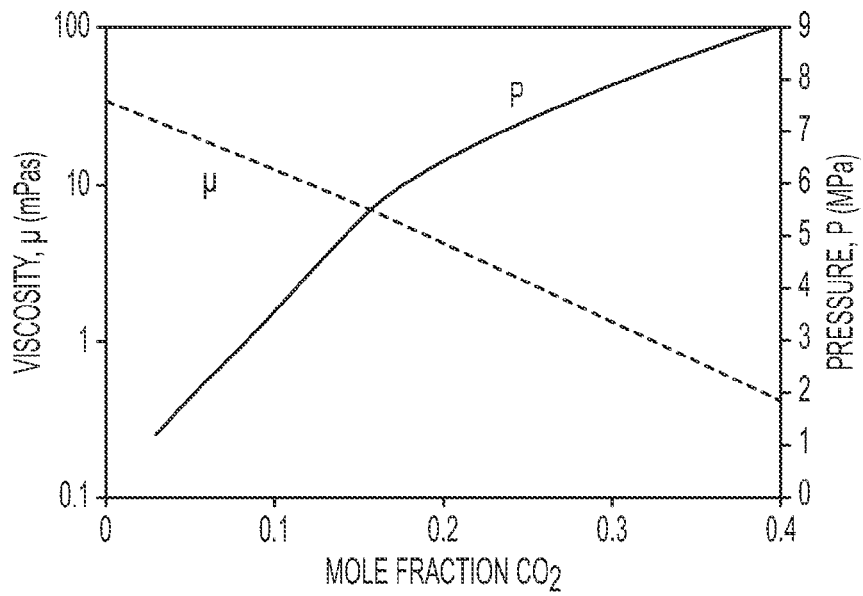
FIG. 1 graphically shows that as the pressure of gas increases in the mixture, the viscosity drops by several orders of magnitude.

The properties of lubricant/CO2 mixtures under pressure have been studied in refrigeration applications [12]. CO2 can be used as an alternative to chlorinated organic refrigerants that are being phased out for environmental reasons [13]. The phase behavior, tribology, and heat transfer characteristics of CO2 and synthetic lubricants at high pressure and low temperature has been studied to determine the most appropriate operating parameters for this application [14]. At low gas concentrations (<40%), the viscosity of these mixtures can decrease by several orders of magnitude as shown in FIG. 1. The viscosity of a lubricant-gas mixture is a function of composition, which can be controlled by increasing the system pressure. As pressure of gas increases in the mixture, the viscosity drops by several orders of magnitude. Since the pressure of CO2 drives the composition of the mixture, it is possible to control viscosity directly using pressure. The effect of this relationship on surface wear has been reported [15]. Nevertheless, the important implications of viscosity control using dissolved gases for power loss reductions in typical industrial bearings have not yet been investigated.

Here we provide a method and system to develop smart lubricants that are binary mixtures of synthetic lubricants and pressurized carbon dioxide. These gas-expanded lubricants (GELs) could be used to control viscosity in real time. When coupled with a controller measuring shaft speed or applied load, this system would allow for adjustments to lubricant viscosity in response to rotor conditions. GELs have the potential to decouple viscosity and efficiency in tilting-pad journal bearings, without sacrificing performance capabilities in the bearing. A schematic of the proposed technology is presented in FIG. 2a. Pressurized gas and lubricants are delivered in response to variable environmental or loading conditions. Gas could be purged from the bearing to restore the original viscosity of the lubricant prior to recycling. Because bearings are ubiquitous in industrial settings, a method to improve their efficiency could represent significant energy savings on a large scale. In this work, the viscosity of binary polyalkylene glycol/CO2 mixtures was measured for a bearing relevant set of conditions using a rheometer with a high-pressure cell. These results were input to a thermoelastohydrodynamic analysis code developed by this research group. The code solves the temperature and bearing dynamic coefficients simultaneously and has been previously shown to effectively predict the performance of lubricants in tilting-pad bearing systems [17].

Aspects of various embodiment of the present invention are directed to a composition, method and system for the use of a gas-expanded lubricant in bearings and other parts.

An aspect of an embodiment of the present invention includes a system for lubricating at least one moving part 24 with a medium. As shown in FIGS. 2B-2C, the system may comprise a pressurized chamber 22 configured to house at least one moving part 24, a lubricant reservoir 20 configured to house a lubricant, and a gas reservoir 18 configured to house a gas. The lubricant and gas are dissolved into a mixture 26 in the pressurized chamber 22 to form the medium. The system may include a controller 16 to provide the transfer of lubricant from the lubricant reservoir 20 and gas from the gas reservoir 18 to the moving part 24. The controller 16 may function by determining the respective proportions of the lubricant and gas in forming the dissolved mixture 26 in response to input conditions 14. The supply of additional gas to the pressurized chamber 22 may be implemented thereby increasing the pressure and/or impacting the thermal conductivity, temperature and/or other properties of the mixture 26 in the pressurized chamber 22. The system may include a gas purge device 28 configured to vent gas from the pressurized chamber 22 thereby decreasing the pressure and/or impacting the thermal conductivity, temperature and/or other properties of the mixture 26 in the pressurized chamber 22. The system may include a return channel 30 configured to scavenge surplus lubricant from the pressurized chamber 22 and to return the lubricant to the lubricant reservoir 20.

Figure 2A:
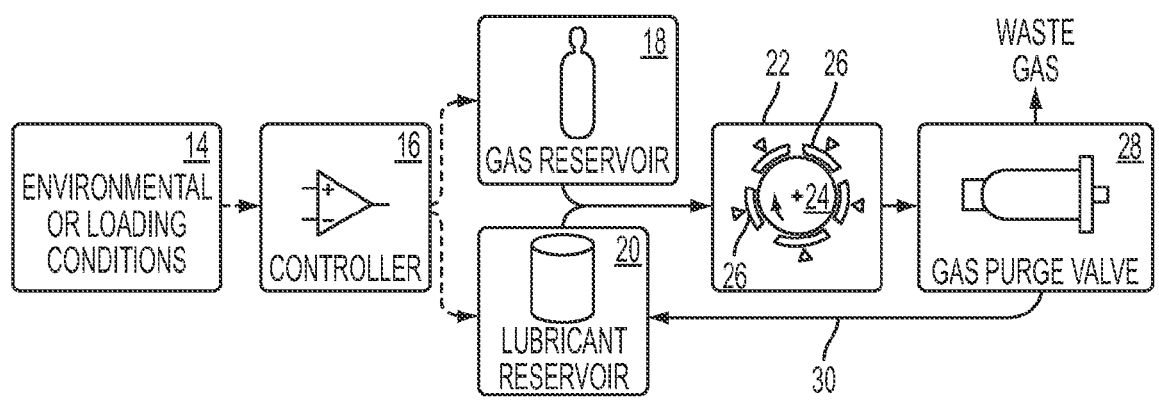
FIG. 2a provides a schematic illustration of an embodiment of the system.
Figure 2B:
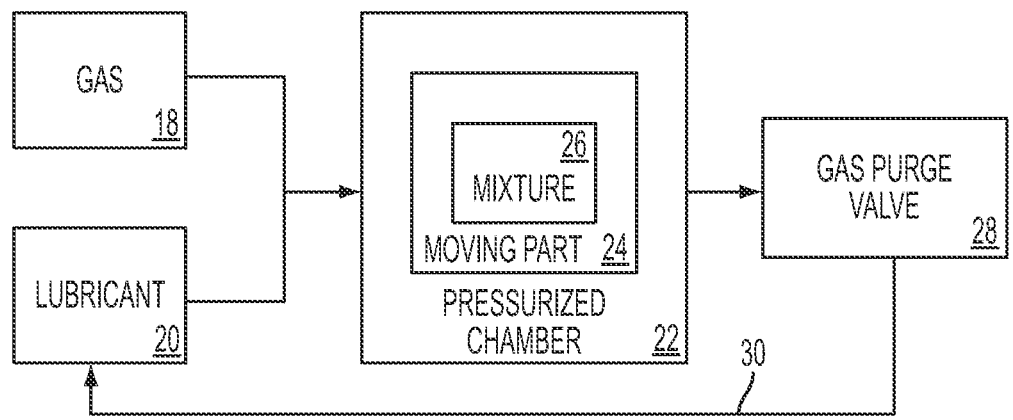
FIG. 2b provides a schematic illustration of an embodiment including the pressurized chamber, lubricant reservoir, gas reservoir, and gas purge valve of in the system.
Figure 2C:
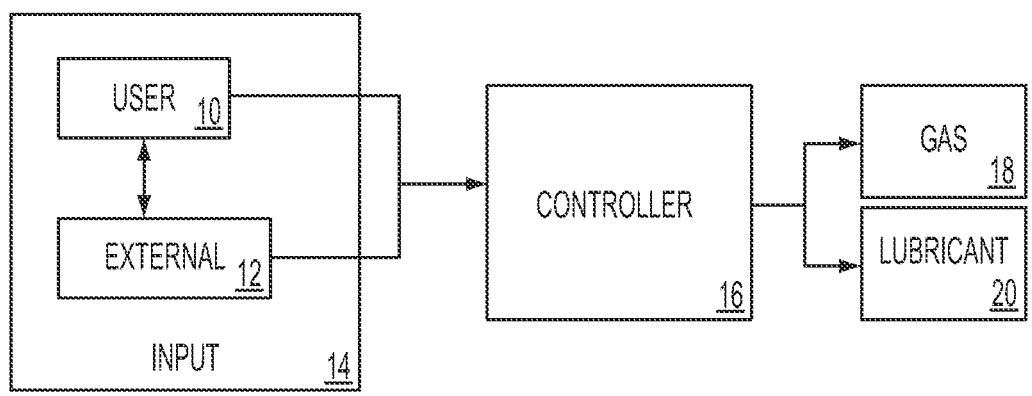
FIG. 2c provides a schematic illustration of an embodiment including the relationship between the controller, the input conditions, the lubricant reservoir, and the gas reservoir that are included in the system.

As shown in FIG. 2A, an aspect of an embodiment of the present invention includes a system for lubricating at least one moving part 24 with a medium as determined by the mixture 26. The system may comprise a pressurized chamber 22 configured to house at least one moving part 24, a lubricant reservoir 20 configured to house a lubricant, and a gas reservoir 18 configured to house a gas. The lubricant and gas are dissolved into the mixture 26 in the pressurized chamber 22 to form the medium. The system may include a controller 16 (or processor or the like) to provide the transfer of lubricant from the lubricant reservoir 20 and gas from the gas reservoir 18 to the moving part 24. The controller 16 may function by determining the respective proportions of the lubricant and gas in forming the dissolved mixture 26 in response to input conditions 14, such as environmental or loading conditions. The system may include a gas purge device 28 configured to vent gas from the pressurized chamber 22 thereby decreasing the pressure and/or impacting the thermal conductivity, temperature and/or other properties of the mixture 26 in the pressurized chamber 22. The system may include a return channel 30 configured to scavenge surplus lubricant from the pressurized chamber 22 and to return the lubricant to the lubricant reservoir 20.

It should be appreciated that the moving part 24 may be a rotor, bearing, gear, a combination of these and/or the like, which may be housed in a pressurized chamber 22.

The lubricant may be a synthetic lubricant, semi-synthetic lubricant, petroleum oil, refined petroleum oil, a combination of these and/or the like. The synthetic lubricant may be a Polyalkylene Glycol (PAG), Poly-Alpha Olefin (PAO), Trimethylolpropane (TMP) Ester, or other lubricant formulation with good gas solubility, as well as a combination of these and/or the like.

The compressed gas may be Carbon Dioxide, Nitrogen, Argon, Air, Helium, a combination of these and/or other compressed gasses of similar characteristics as desired or required.

The gas purge device 28 may be a valve, vent, egress, or a combination of these and/or the like.

The dissolved mixture 26 may have properties between those of a pure lubricant and a gas.

The dissolved mixture 26 may have properties, such as viscosity, thermal conductivity, and/or temperature, which are adjusted in adding and/or releasing at least some of the gas from the pressurized chamber.

The input conditions 14 may be defined by a user 10 and/or a controller in response to some external factor 12.

The input conditions 14 may be configured in real time, continuously, and/or over intervals of time.

An aspect of an embodiment of the present invention includes a method of lubricating at least one moving part with a medium. The medium includes a dissolved mixture of lubricant and compressed gas. The amount of lubricant and compressed gas may be controlled in forming the dissolved mixture in response to input conditions. A user and/or external factors may be used to determine the input conditions. In response to the input conditions the amount of lubricant and compressed gas is delivered to the moving part that is housed in a pressurized chamber. The properties of the dissolved mixture can be adjusted, whereby the properties may include, but are not limited to, the following: viscosity, temperature, and thermal conductivity. This adjustment to the gas may be accomplished, for example, by releasing gas from the pressurized chamber in an amount to adjust the properties. In a further approach, lubricant may be scavenged from the pressurized chamber by returning surplus lubricant to its original source or other designated location.

EXAMPLES

Practice of an aspect of an embodiment (or embodiments) of the invention will be still more fully understood from the following examples and experimental results, which are presented herein for illustration only and should not be construed as limiting the invention in any way.
Experimental Methods The viscosity of the lubricants and lubricant-$CO_2$ mixtures was measured using an Anton-Paar MCR 301 rheometer equipped with a high-pressure measuring cell rated up to 15 MPa. The $CO_2$ was delivered using a Teledyne ISCO 500 HP syringe pump with a constant temperature jacket. The temperature jacket was needed to ensure that liquid $CO_2$ was being delivered to the pressure cell such that an equation of state estimate of $CO_2$ temperature, pressure, and volume could be applied to calculate the mixture composition [18].

Temperature was controlled to within ±0.1° C. using a peltier style temperature controller integrated into the rheometer. The lubricant was added to the pressure cell volumetrically. Measurements of viscosity were made over a range of shear rates to ensure that the mixtures exhibit Newtonian or near-Newtonian behavior. The range was selected to be 1-1000 s$^{-1}$ based on early trials and on the range of shear rates that would be expected in a tilting-pad journal bearing environment.

The high-pressure behavior of lubricant mixtures has been investigated in the past and empirical relationships proposed to estimate mixture properties [10]. In particular, the viscosity of mixtures has been approximated using Eq. 1.

$$ln\mu_m = x_1 \ln \mu_1 + x_2 \ln \mu_2 \quad (1)$$

Where $\mu_m$ is the viscosity of the lubricant mixture and x and $\mu$ are the mass fraction and viscosity of the components. This convenient relationship relies on easily measured properties that are usually readily obtained. For a diverse range of lubricant molecular structure, Eq. 1 has been shown to be an effective guide to mixture properties though the relationship has not yet been tested for mixtures of lubricants with compressed gas. A goal of the experimental portion of this work was to determine whether lubricant/$CO_2$ mixtures could be understood using a similar relationship.

Modeling Framework

Figure 3:
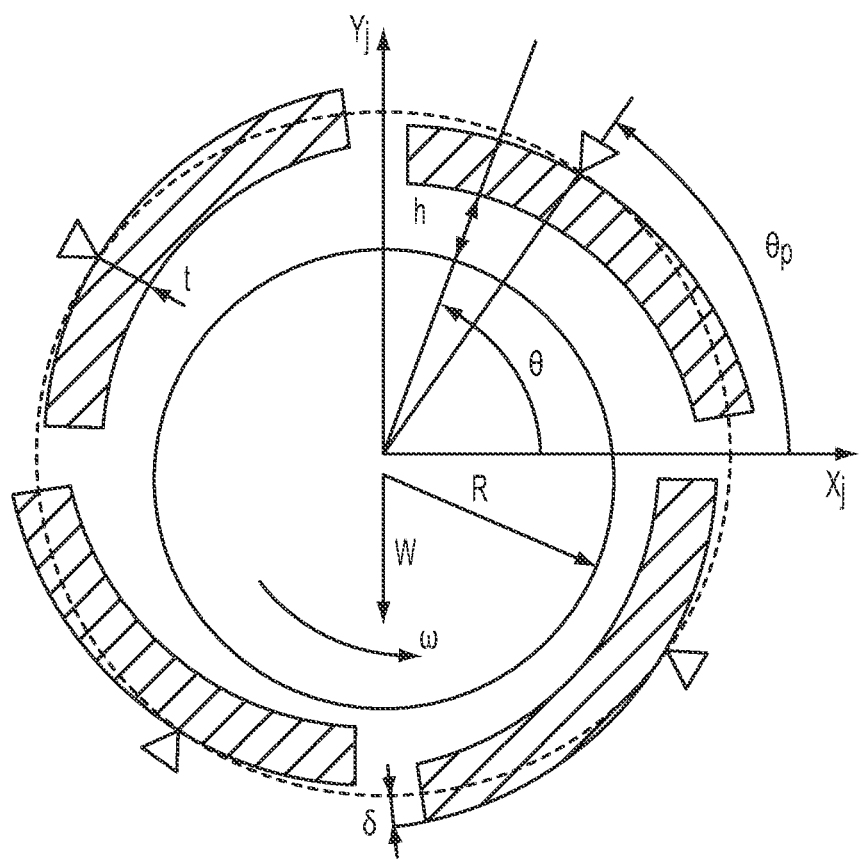
FIG. 3 is a schematic of the tilting pad journal bearing along with important system variables that are used in the modeling framework.

A modeling approach developed by He [17] for tilting-pad journal bearings was used to evaluate the performance of GELs. The thermoelastohydrodynamic (TEHD) framework simultaneously predicts a number of key bearing performance measures including journal operating position, altitude angle, power loss, maximum temperature and the bearing dynamic coefficients. Previous models did not effectively capture the lubricant or journal maximum temperature, and the resulting thermal expansions, and so were ineffective at predicting bearing operating conditions for real lubricants over a range of operating conditions [19]. The TEHD model solves the coupled pressure, temperature and elasticity problem simultaneously using a series of iterations [20]. The hydrodynamic pressure is calculated from the generalized Reynolds equation and a two-dimensional energy equation is derived to calculate the temperature distribution. The pad mechanical and thermal deformations are then calculated using a two-dimensional finite element numerical method. The model also accounts for lubricant turbulence effects and pivot flexibility. A schematic of the tilting pad journal bearing along with important system variables (used in the modeling framework) is presented in FIG. 3.

Elastohydrodynamic Modeling

The TEHD model is based on the generalized 2-D form of Reynolds equation (Eq. 1). The Reynolds equation forms the cornerstone of hydrodynamic analysis and was originally derived from the Navier Stokes equation and the continuity equation assuming a thin film [21]. Several key assumptions are made to arrive at the Reynold's equation, namely that the pressure gradient across the film thickness is zero, that no slip conditions hold on the surface, and that the fluid exhibits constant density. The equation allows for the solution of pressure profile in this thin film as a function coordinates, film thickness, surface speed and most importantly for this work, lubricant viscosity. The generalized form of the Reynolds equations (Eq. 2 and 3) allows for the variation of the viscosity across the film as well as for the presence of turbulence.

$$\frac{\partial}{\partial x}\left\{h^3 \Gamma(x,z) \frac{\partial P}{\partial x}\right\} + \frac{\partial}{\partial z}\left\{h^3 \Gamma(x,z) \frac{\partial P}{\partial z}\right\} = -UG(x,z)\frac{\partial h}{\partial x} \quad (2)$$

Where $$\Gamma(x,z) = \int_0^1 \left[\zeta_2(x,y,z) - \frac{\zeta_2(x,1,z)}{\zeta_1(x,1,z)}\zeta_1(x,y,z)\right]dy, \quad (3)$$

$$G(x,z) = \frac{1}{\zeta_1(x,1,z)}\int_0^1 [\zeta_1(x,y,z)]dy$$

$$\zeta_1(x,y,z) = \int_0^y \frac{1}{\mu_e(x,y',z)}dy',$$

$$\zeta_2(x,y,z) = \int_0^y \frac{y'}{\mu_e(x,y',z)}dy',$$

The lubricant effective viscosity ($\mu_e$) appears in several terms of the Reynolds equation. Effective viscosity is used to account for the effects of increased stresses in the lubricant under turbulent conditions. These stresses in the lubricant are modeled using the near wall eddy viscosity model that has been applied widely in similar models of bearing dynamics. The effect of turbulence stresses on the lubricant, caused by speed, is combined with the eddy viscosity law ($\epsilon_m$) to express the viscosity as an effective viscosity $\mu_e$ (Eq. 4).

$$\mu_e(x,y,z) = \mu\left(1 + \frac{\epsilon_m}{\nu}\right) \quad (4)$$

Power loss in tilting pad journal bearings results from shearing in the lubricant film. This shear stress is a function of the effective lubricant viscosity and the velocity gradient. As defined in Eq. 4, the effective viscosity of the lubricant incorporates the dynamic viscosity and the turbulent viscosity. The velocity gradient is obtained from the pressure solution of the generalized Reynolds equation. A viscous lubricant exerts a resisting torque on the torque that drives the bearing. The power loss describes the energy required to overcome the resisting torque. Petroff's equation for concentric cylinders can be used for a good approximation of this effect [3, 22]. The TEHD model takes the journal eccentricity into account by dropping the concentric assumption of Petroff's model. Eccentricity is included in the estimate for power loss as a function of the journal speed and shear stresses (Eq. 9).

$$P_{loss} = \omega R \int_0^{2\pi}\int_0^L \tau(\theta,z)d\theta dz = U\int_0^{2\pi}\int_0^L \tau(\theta,z)d\theta dz \quad (5)$$

The temperature profile in the bearing can be solved using the 3D form of the generalized energy equation. In an effort to reduce the computational intensity of the 3D version of this model, previous work has demonstrated that the temperature profile in the axial direction is generally a constant polynomial function based on known boundary conditions [23]. To simplify the energy equation, the temperature in the axial direction is integrated and the resulting 2D equation is solved for the radial and circumferential directions (Eq. 8).

$$\rho C_p \left( u \frac{\partial T}{\partial x} + v \frac{\partial T}{\partial y} \right) = \frac{\partial}{\partial x} \left( k \frac{\partial T}{\partial x} \right) + \frac{\partial}{\partial y} \left( k_e \frac{\partial T}{\partial y} \right) + \mu_e \left( \left( \frac{\partial u}{\partial y} \right)^2 + \left( \frac{\partial v}{\partial y} \right)^2 \right) \quad (6)$$

The response of the bearing to dynamic loading, speed, or lubricant conditions is modeled as a set of linearized stiffness and damping coefficients at the location of the bearing on the shaft. The forces acting on the shaft for small amplitude motion are:

$$\begin{bmatrix} F_x \\ F_y \end{bmatrix} = \begin{bmatrix} K_{xx} & K_{xy} \\ K_{yx} & K_{yy} \end{bmatrix} \begin{bmatrix} x_j \\ y_j \end{bmatrix} + \begin{bmatrix} C_{xx} & C_{xy} \\ C_{yx} & C_{yy} \end{bmatrix} \begin{bmatrix} \dot{x}_j \\ \dot{y}_j \end{bmatrix} \quad (7)$$

The reduced set of coefficients is composed of the principal direction (xx and yy) and the cross coupling direction (xy and yx). These speed dependent dynamic coefficients are calculated by expressing the film thickness and pressure as a linear combination of a steady state component and the perturbed component. The Reynolds equation is solved for the perturbed pressure and the coefficients are calculated through the integration of the perturbed pressure.

Model Validation

Figure 4A:
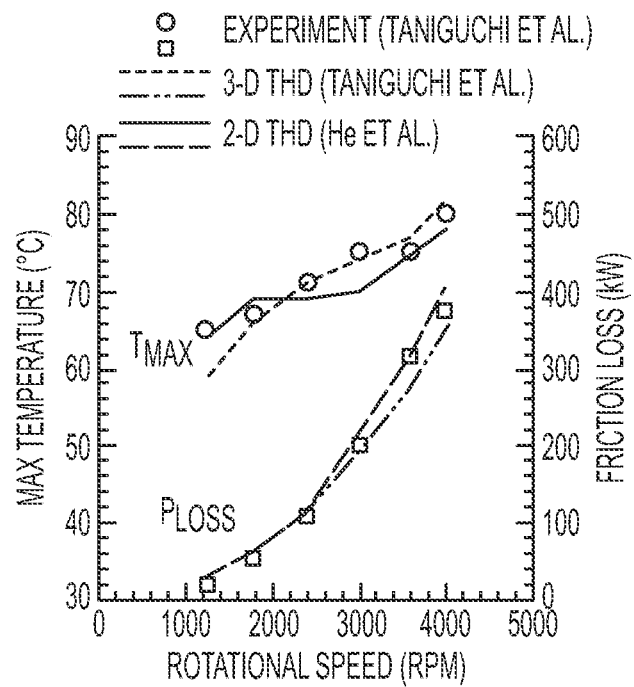
FIG. 4a graphically demonstrates the effectiveness of the thermoelastohydrodynamic (TEHD) model in predicting journal temperature.
Figure 4B:
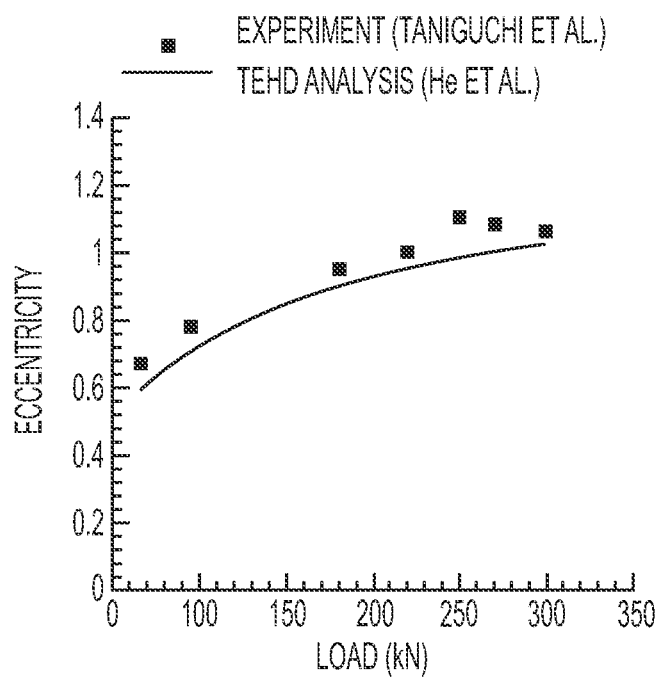
FIG. 4b graphically demonstrates the effectiveness of the thermoelastohydrodynamic (TEHD) model in predicting eccentricity.

The TEHD model has been validated and shown to correlate effectively with experimental results for a number of journal bearing configurations. The effectiveness of the TEHD model was first shown in He [17]. In FIGS. 4a and 4b, the model results are compared to experimental results from Taniguchi [24]. These published modeling and experimental results demonstrate the effectiveness of the model in predicting journal temperature (left) and eccentricity (right) data published in [24]. The TEHD model approximations for journal temperature correlate closely with the experimental and modeling results of Taniguichi. The eccentricity estimates of the model also effectively capture the behavior of the bearing.

Modeling Parameters

The bearing size and geometry employed in this paper was selected to be representative of a large number of tilting pad bearings based on the work of Fillon et al. [25]. The conditions are listed in Table 1.

TABLE 1

Bearing parameters used in this work.

| Parameter | Value | Unit |
|---|---|---|
| Diameter | 0.1 | m |
| Pad Thickness | 0.02 | m |
| Length | 0.07 | m |
| Clearance | 7.9 × 10$^{-5}$ | m |
| Preload | 0.47, 0.15 | |
| Offset | 0.5 | |
| Configuration | LBP | |
| Number of Pads | 4 | |

Lubricants Modeled

Polyalkylene glycol (PAG) was selected for this work because it is a widely used class of synthetic lubricants and because the phase behavior and viscosity of high-pressure $CO_2$/PAG mixtures is well understood [14]. Petroleum-based lubricants are not suitable for gas-expanded lubricant applications because the heterogeneous chemical composition of petroleum-based lubricants and variations between blends makes their high-pressure phase behavior in $CO_2$ highly variable [26]. In addition, undesirable side effects are common such as the extraction of low molecular weight components. Synthetic lubricants, such as PAG, are well suited for mixing in $CO_2$ since relevant properties (such as molecular weight, polarity, branching, etc) can be specified a priori and are available commercially [27]. For this work, a PAG blend was selected with viscosity close to that for a reference fluid, ISO 32 (Table 2).

TABLE 2

Lubricant properties modeled in this work. Values were obtained experimentally and from [14, 28]

| Lubricant Property | PAG[1] | 95% PAG + 1% $CO_2$ | 85% PAG + 5% $CO_2$ | Reference Fluid | Units |
|---|---|---|---|---|---|
| Density | 970.5 | 891 | 732 | 861 | Kg/m3 |
| Dynamic Viscosity at 40° C. | 17 | 15.3 | 11.9 | 28 | mPa · s |
| Dynamic Viscosity at 100° C. | 4 | 3.6 | 2.8 | 4.8 | mPa · s |
| Specific heat capacity | 2075.37 | 2089 | 2117 | 1950.4 | Joule/Kg · K |
| Thermal Conductivity | 0.159 | 0.152 | 0.138 | 0.149 | W/m · K |

[1]PAG used for these trials is UCON 50-HB-100 water soluble, 50% by weight oxyethylene and oxypropylene, manufactured by Dow Chemical (Midland, MI).
2 - Reference Fluid is ISO 32, a generic mineral-based lubricant used as a benchmark in tilting-pad bearing systems, obtained from McMaster-Carr.

Experimental Results

Figure 5:
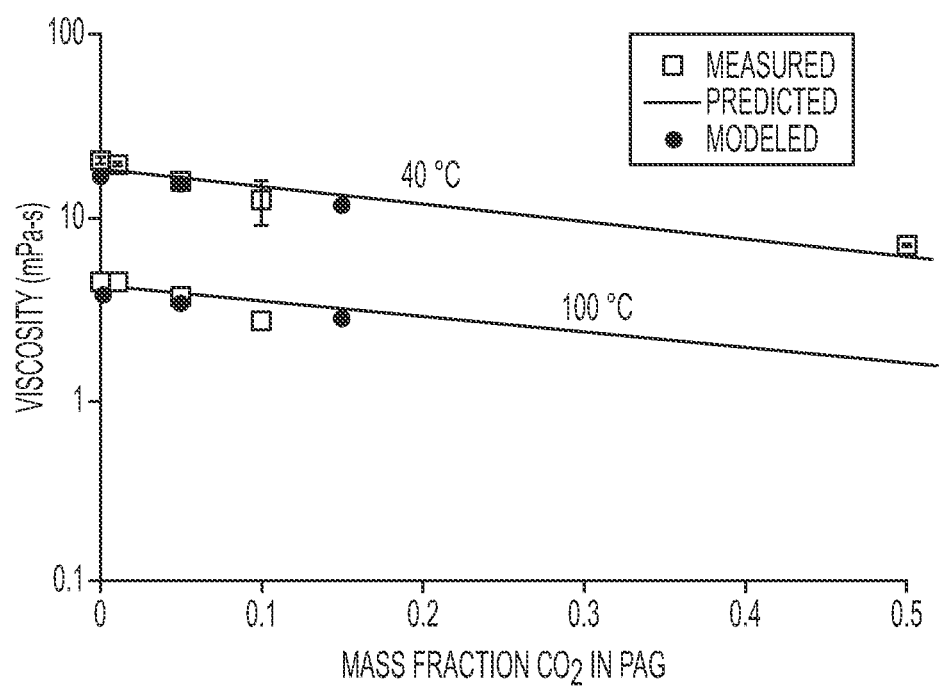
FIG. 5 graphically shows the viscosity of PAG-$CO_2$ mixtures as a function of mixture composition at 40° C. and 100° C.

Measurements of GEL viscosity showed that $CO_2$ can be effectively used to reduce the viscosity of the PAG lubricant tested here. The results, presented in FIG. 5, reflect viscosity reductions of nearly 65% over the range of compositions tested here at 40° C. FIG. 5 shows viscosity of PAG-$CO_2$ mixtures as a function of mixture composition at 40° C. and 100° C. The measured results were obtained experimentally while the predicted value is obtained using Eq. 1. The modeled values represent those that were input to the TEHD model of tilting-pad journal bearing performance. At 100° C. the effect is equally pronounced. The viscosity values used for this modeling effort are also presented in FIG. 6. These values were selected by incorporating published values [13] with the experimental values collected here. PAG is a commercial lubricant and variations between suppliers and batches are common. To ensure that the results modeled here were conservative, the modeled viscosity values tended to underestimate the influence that $CO_2$ would have on viscosity. In practice, the PAG tested here could achieve the same outcomes with lower levels of $CO_2$.

To evaluate the effect of variable shear rates on these binary mixtures, lubricant viscosity was measured over a range from 1-1000 s$^{-1}$. The results, not shown here because the lubricant behavior was Newtonian, suggest that GELs will not experience significant phase separation over the range of shear values typically encountered in a tilting pad journal bearing. As a final benchmark of the viscosity measurements, the viscosity of ISO 32 was also measured. The measured viscosity of 24.9 mPa-s±1.4 MPa is consistent with published values of 28 MPa at 40° C.

Modeling Results

Figure 6:
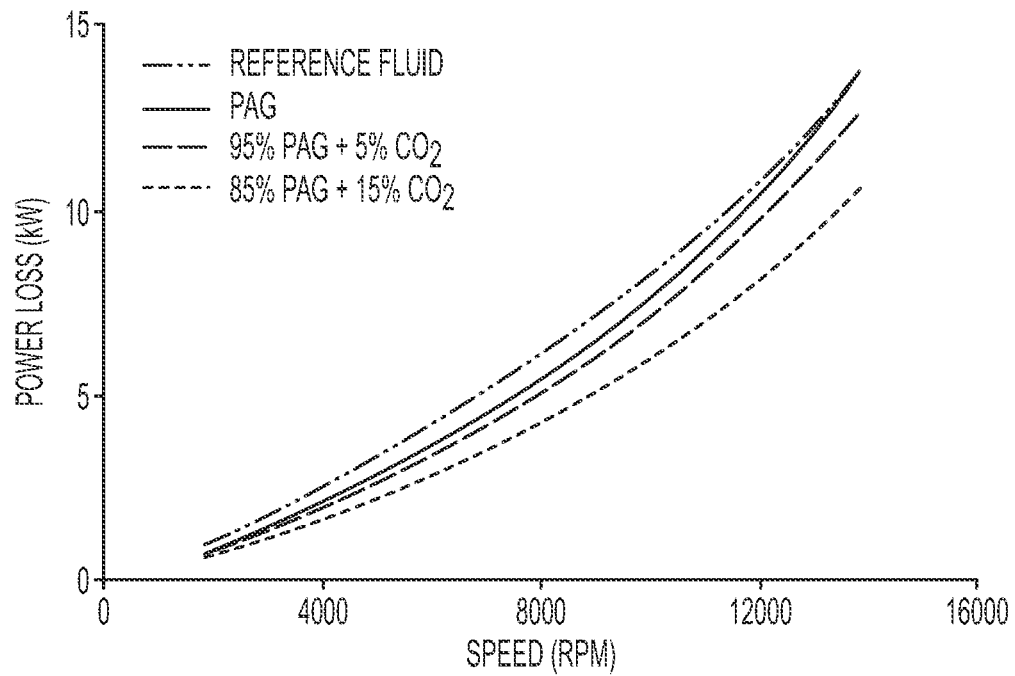
FIG. 6 graphically shows the power loss for several mixture compositions as a function of speed.

The modeling results suggest that the use of GELs could provide a power loss reduction greater than 20% over a wide range of speed up to 14000 rpm (FIG. 6). This result can be best understood in the context of the power loss equation (Eq. 5). Power loss is a function of shaft rotational velocity or speed and shear forces in the lubricant. Shaft rotational velocity is usually specified by the application and cannot generally be modified to reduce power losses. Shear rate in the lubricant, on the other hand, can be controlled independently of the device in which the bearing is being used since it is proportional to lubricant viscosity. Shear is the product of viscosity and the velocity gradient in the lubricant film. Lower viscosities will result in lower power loss. In effect, by dialing down viscosity in a GEL, it is possible to directly lower the power loss in the bearing, without substantially changing the function of the mechanical system in which the bearing is used.

The three lubricant/$CO_2$ conditions modeled here, 0%, 5%, and 15% $CO_2$ were selected to cover the range of easily achieved mixtures. 100% PAG (0% $CO_2$) was included to show that the performance advantages come from the mixture of $CO_2$ and lubricant and not just from the use of PAG relative to the ISO 32 reference fluid. The power loss values for the reference fluid and the 100% PAG were very comparable. $CO_2$ can be added to PAG gradually up to a composition of ~40% after which the pressure required to stabilize the mixture is unreasonably high for most industrial situations. In addition, the viscosity and other properties of such mixtures would be comparable to available gas-lubricated bearings. In practice, discrete mixtures would not be delivered to the bearing. Instead, the $CO_2$ delivered to the bearing over a continuous range of compositions that would depend on the specific lubricant and the pressure rating of the seals in the bearing. Also, in practice a GEL could be used to produce an independent power loss curve unlike those reported in FIG. 6. FIG. 6 shows power loss as a function of speed. Efficiency improvements of nearly 20% are observed over a range of operating speeds when using GELs compared to a reference lubricant. In such a scenario, $CO_2$ would be added to the lubricant gradually as speed is increased to reduce the associated power loss.

A preliminary energy balance on a bearing using GELs suggests that the energy needed to compress the $CO_2$ up to the required pressure is much lower than the energy savings provided by using the GEL. The energy requirement for $CO_2$ compression is on the order of 1 W if we assume that the $CO_2$ is compressed isentropically from 4 MPa, roughly the pressure of a commercially available canister of $CO_2$, up to 9 MPa, the highest pressure we would expect to need if mixing PAG and $CO_2$ (FIG. 1). This power consumption estimate is several orders of magnitude lower than the 1-3 kW that are possible by using GELs. For this estimate the flow rate of lubricant/$CO_2$ mixture into the bearing is assumed to be 0.003 $m^3$/min and 30% $CO_2$. These flow rates are much lower than those required by gas-lubricated bearings where the pads must be continuously supplied with a steady stream of compressed gas.

Figure 7:
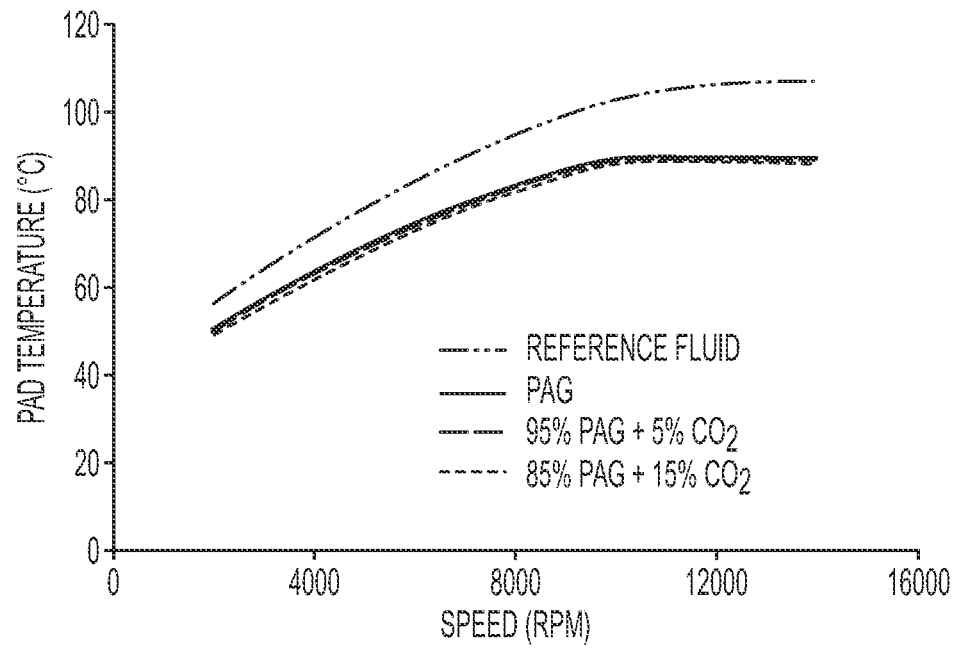
FIG. 7 graphically shows the pad temperature for several mixture compositions as a function of speed.

Consistent with the predicted power loss reductions, pad temperatures were estimated to be approximately 15% lower when using a PAG or GEL mixture compared to the reference fluid (FIG. 7). FIG. 7 shows pad temperature as a function of speed. A desirable reduction in pad temperature can be achieved using GELs due largely to the superior heat removal characteristics of the PAG lubricant but also to the reduction in power loss provided by GELs. The temperature profile in the lubricant is an important characteristic in practice since excessively high temperatures can lead to thermal degradation of the lubricant or damage to the pad material. The temperature reduction observed here seems to be driven by the fact that PAG and the PAG+$CO_2$ mixtures have a higher heat capacity and thermal conductivity than the ISO 32 (Table 1). This is not particularly surprising since PAGs are designed for use in heat transfer as well as lubrication applications. But the lower temperatures may also be caused in part by the lower viscosity of the PAG+$CO_2$ mixtures. The lower shear that results from the addition of $CO_2$, responsible for reductions in power loss, is also likely to contribute to lower residual heat in the bearing. The fact that the pad temperature is seemingly independent of $CO_2$ concentration is encouraging since $CO_2$ has a lower molecular density and thermal conductivity than most lubricants. It would be reasonable to expect that the heat capacity of a lubricant would be negatively affected when introducing dissolved gas. The model results suggest that the unfavorable thermal properties of $CO_2$ are not significant for the bearing geometry under the conditions tested here.

Figure 8:
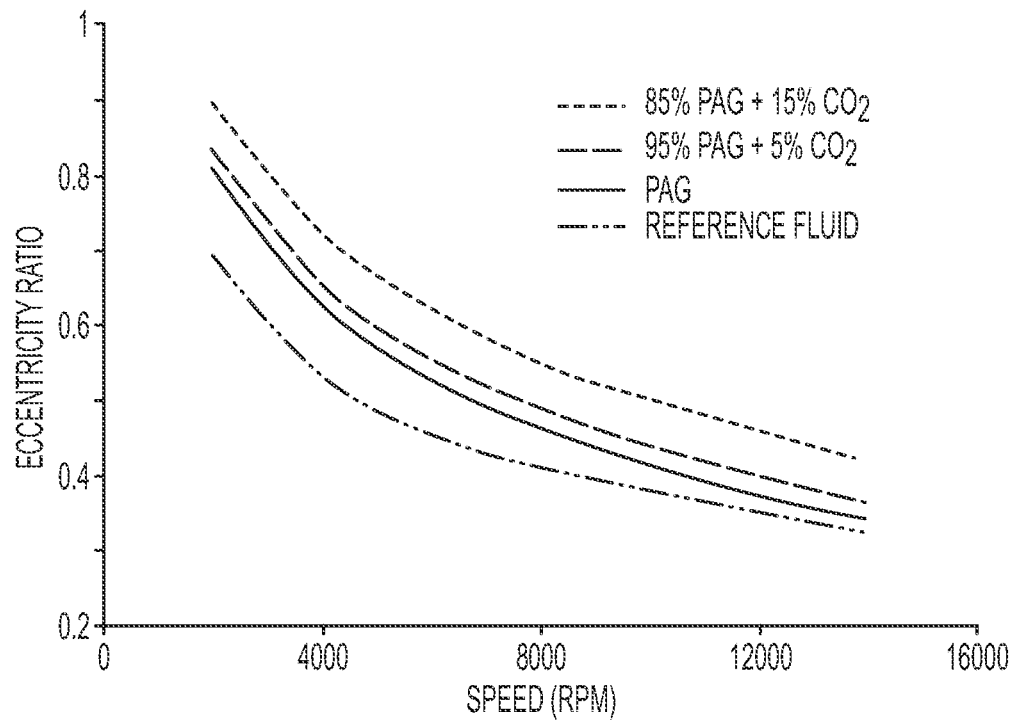
FIG. 8 graphically shows the journal eccentricity ratio for several mixture compositions as a function of speed.

The eccentricity ratio results show that GEL mixtures containing up to 30% $CO_2$ effectively support the load of the bearing (FIG. 8). FIG. 8 shows journal eccentricity ratio as a function of speed. The presence of CO2 in the GELs does increase the eccentricity ratio as expected but not outside the normal operating range for this type of bearing. These results were encouraging in light of the computational method used to estimate the load capacity in the TEHD model. The numerical method used to solve the model does not compute load directly but rather solves for the pressure and iteratively determines load. When the model does not converge, it indicates that the lubricant is incapable of supporting the applied load. The model successfully converged under each of the GEL conditions modeled here suggesting that the mixtures are capable of handling the applied load. In addition, when the eccentricity ratio is high, the thin lubricant film can produce heat build-up that is unfavorable. This excess heat accumulation was not observed under any of the conditions tested. Relative to the ISO 32 reference fluid the eccentricity of the PAG mixtures is somewhat higher but still within the normal operating range for tilting pad journal bearings. Particularly at higher speeds, the eccentricity difference between the fluids was not significant. These eccentricity ratio data are encouraging and indicate that GELs should not interfere with the normal bearing function.

A sensitivity analysis was conducted on the model to determine the effect of bearing preload on lubricant function. The results of this analysis, shown in FIG. 9 for bearing power loss under two different preloading conditions, indicate that the effect of GELs is independent of bearing geometry/preload. A preload of 0.47 (original test conditions) and 0.15 was modeled. In both cases the model converged successfully and the percent power loss improvement remained constant. In fact, the results demonstrate that the use of GELs could reduce power loss more significantly than a drop in preload. The benefits of GELs on pad temperature and eccentricity were similarly independent of preloading conditions.

Figure 9:
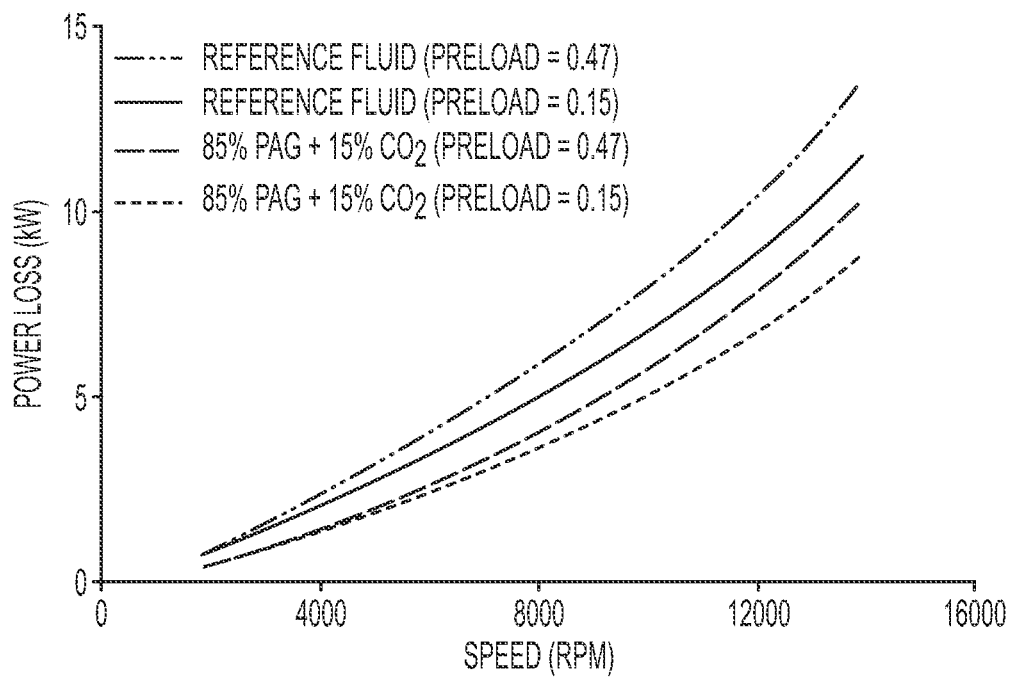
FIG. 9 graphically demonstrates the results of sensitivity analysis conducted on the TEHD model to determine the effect of bearing preload on lubricant function.
Figure 10A:
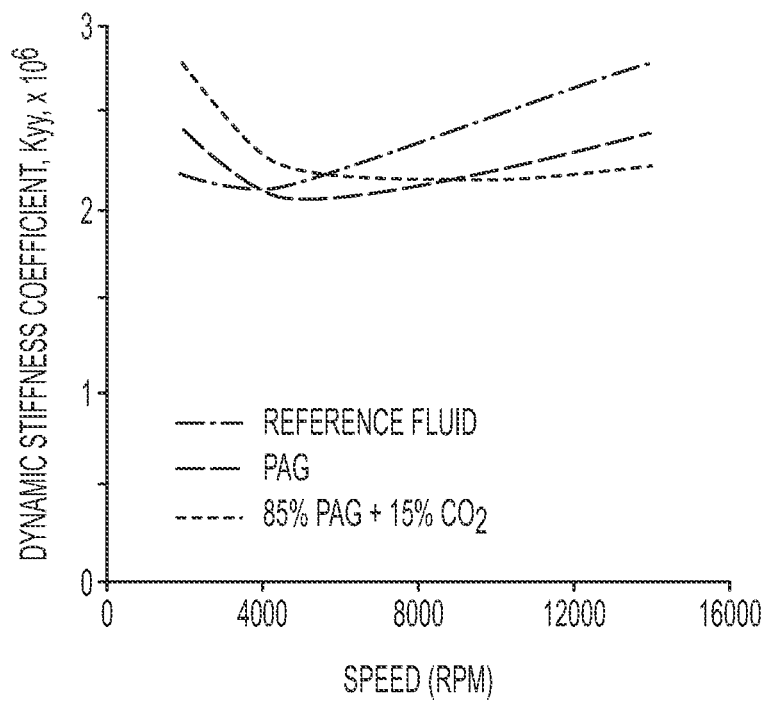
FIG. 10a graphically shows the bearing stiffness coefficients for the reference fluid, PAG, and PAG+$CO_2$ under a preload of 0.47.
Figure 10B:
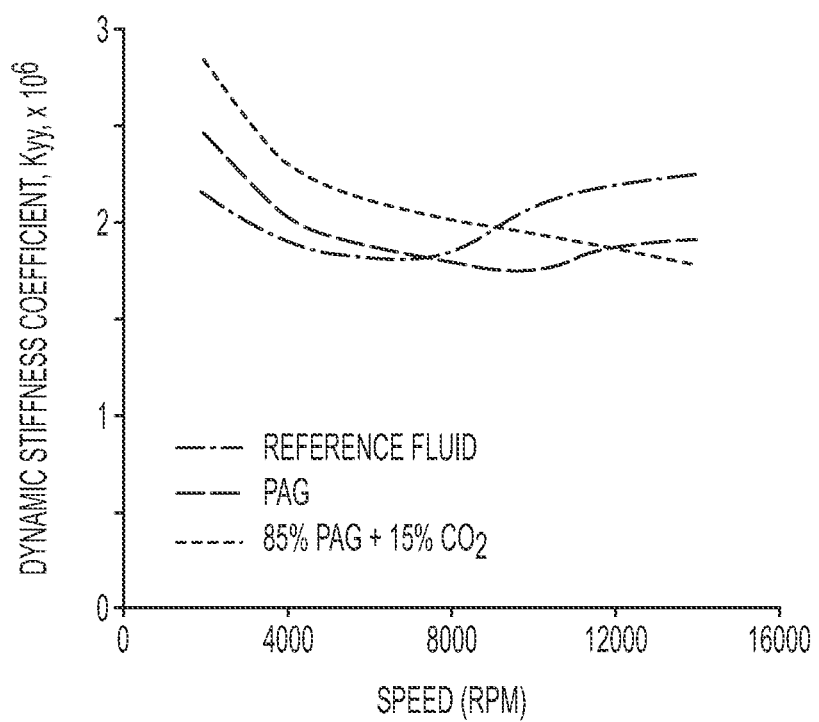
FIG. 10b graphically shows the bearing stiffness coefficients for the reference fluid, PAG, and PAG+$CO_2$ under a preload of 0.15.

As a final measure of bearing performance in the presence of GELs, the stiffness and damping coefficients of the bearing were calculated. The results shown in FIGS. 10a and 10b suggest that GELs could impart beneficial stiffness behavior to a bearing when incorporated into a rotor system. FIGS. 10a and 10b show the bearing stiffness coefficients for the reference fluid, PAG, and PAG+$CO_2$ under a preload of 0.47 and 0.15, respectively. Since the bearing was modeled with four pads, the stiffness coefficients are symmetric such that $K_{xx}$ and $K_{yy}$ are identical. The values shown in FIG. 9 are for $K_{yy}$ under a high and low preload level. At high speed, the results show a reduction in the stiffness coefficient when $CO_2$ is introduced into the PAG mixture. The reduction suggests a softer bearing stiffness at the high speed. The soft bearing will allow a shaft motion inside the bearing and hence an increase in the effective damping of the system. The increase in the effective damping of the system is an advantage for systems that operate at high speeds particularly in light of the stiffness coefficient for the reference fluid which increases with speed. The bearing damping coefficients ($C_{xx}$ and $C_{xy}$) showed an almost negligible change between the reference fluid, pure PAG, and the mixture of PAG/$CO_2$. This combination of a flexible stiffness coefficient and an unchanged damping coefficient suggest that the presence of $CO_2$ in GELs is unlikely to compromise the stability of a rotor system and that it will likely be beneficial for bearings, particularly those that operate at higher speeds.

An aspect of the method and system provides, but not limited thereto, the use of lubricant/gas mixtures that can be tuned in response to changing speed or loading conditions to improve the energy efficiency of tilting pad journal bearings. These gas-expanded lubricants or GELs could provide the foundation for a new type of smart lubricant with viscosity that is adjustable in real time. Using the chemical parameters of lubricant/gas mixtures measured by the authors and obtained from the literature, a thermoelastohydrodynamic model of a tilting pad journal bearing was used to estimate the bearing characteristics when using these GELs. The results show a compelling 20% drop in power loss in the presence of these mixtures. This efficiency improvement was observed over a wide range of operating speeds up to 1400 RPM. Estimates of the pad temperature showed an important reduction when using GELs which could help prevent the degradation of the lubricant or damage to the pads. This temperature reduction was attributed to the superior heat transfer properties of the GEL mixture and to the decrease in frictional losses. Journal eccentricity increased slightly when using GELs but it was still within the normal range for this type of bearing and under high speeds did not constitute a problematic increase from conventional lubricants. The bearing stiffness and damping coefficients indicate that presence of $CO_2$ in the lubricant mixture can actually soften the stiffness of the bearing at higher speeds, making the bearing less susceptible to perturbations when incorporated into a rotor system. Taken together, these results suggest a promising application of lubricant gas mixtures. Such smart fluids could greatly reduce the power losses typically associated with bearing systems.

An application where this technology shall have a positive impact would be, but not limited thereto, wind turbines, which are subject to variable loading and high power losses through bearings.

It should be appreciated that various types of computers, processors and systems may be utilized for the modeling.

NOMENCLATURE $C_{xx}$, $C_{yx}$, $C_{xy}$, $C_{yy}$ damping coefficients
$C_p$ lubricant specific heat
D bearing diameter
h film thickness
k lubricant heat conductivity
$k_e$ effective heat conductivity that includes turbulence
$K_{xx}$, $K_{yx}$, $K_{xy}$, $K_{yy}$ stiffness coefficients
P pressure
$P_{loss}$ friction power loss
R journal radius
t pad thickness
T temperature
$T_j$ journal temperature
U journal surface velocity
u lubricant velocity in the circumferential direction
v lubricant velocity in the radial direction
w lubricant velocity in the axial direction
W load
x circumferential coordinate (=Rθ)
$x_j$ horizontal journal coordinate
y radial coordinate
$y_j$ vertical journal coordinate
z axial coordinate
$x_j$ journal horizontal position
$y_j$ journal vertical position
δ pad tilt angle
$δ_{elast}$ elastic deformation
$δ_{Therm}$ Thermal deformation
$ϵ_m$ eddy viscosity
μ lubricant dynamic viscosity
$μ_e$ effective viscosity that includes turbulence
υ lubricant kinematical viscosity
θ circumferential angular coordinate
$θ_P$ pivot angular location
ρ lubricant density
τ shear stress
ω shaft rotational angular velocity

REFERENCES

The following patents, applications and publications as listed below and throughout this document are hereby incorporated by reference in their entirety herein.

The devices, systems, compositions, computer program products, and methods of various embodiments of the invention disclosed herein may utilize aspects disclosed in the following references, applications, publications and patents and which are hereby incorporated by reference herein in their entirety:

[1] Angantyr, A., and Aidanpaa, J. O., 2006, "Constrained Optimization of Gas Turbine Tilting Pad Bearing Designs," Transactions of the ASME. Journal of Engineering for Gas Turbines and Power, 128(4), pp. 873-8.

[2] Brechting, B., Flack, R., Cloud, H., Barrett, L., and He, M., 2005, "Influence of Journal Speed and Load on the Static Operating Characteristics of a Tilting-Pad Journal Bearing with Ball-and-Socket Pivots," Tribology Transactions, 48(3), pp. 283-288.

[3] Nicholas, J., 1977, "A Finite Element Dynamic Analysis of Pressure Dam and Tilting Pad Bearings," Ph.D. thesis, University of Virginia, Charlottesville, Va.

[4] Harangozo, A. V., Stolarski, T. A., and Gozdawa, R. J., 1991, "Effect of Different Lubrication Methods on the Performance of a Tilting-Pad Journal Bearing," Tribology Transactions, 34(4), pp. 529-536.

[5] Glavatskih, S. B., and Decamillo, S., 2004, "Influence of Oil Viscosity Grade on Thrust Pad Bearing Operation," Proceedings of the Institution of Mechanical Engineers, Part J: Journal of Engineering Tribology, 218(5), pp. 401-412.

[6] Taylor, R. I., Dixon, R. T., Wayne, F. D., and Ginsel, S., 2005, Life Cycle Tribology, Elsevier, Lubricants and Energy Efficiency: Life-Cycle Efficiency.

[7] Rimpel, A., and Kim, D., 2009, "Rotordynamic Performance of Flexure Pivot Tilting Pad Gas Bearings with Vibration Damper," Journal of Tribology, 131(2), pp. 021101-12.

[8] Lihua, Y., Shemiao, Q., and Lie, Y., 2009, "Analysis on Dynamic Performance of Hydrodynamic Tilting-Pad Gas Bearings Using Partial Derivative Method," Journal of Tribology, 131(1), pp. 011703-8.

[9] Yuchuan, L., Wang, Q. J., Krupka, I., Hartl, M., and Bair, S., 2008, "The Shear-Thinning Elastohydrodynamic Film Thickness of a Two-Component Mixture," Journal of Tribology, 130(2), pp. 021502-1.

[10] Bair, S., 2004, "The High Pressure Rheology of Mixtures," Journal of Tribology, 126(4), pp. 697-702.

[11] Kitchens, C. L., Hallett, J. P., Bush, D., Lu, J., Liotta, C. L., and Eckert, C. A., 2005, "Thermophysical Properties of Gas Expanded Liquids," eds., New York, N.Y. 10016-5991, United States, pp. 1203.

[12] Tuomas, R., and Isaksson, O., 2006, "Compressibility of Oil/Refrigerant Lubricants in Elasto-Hydrodynamic Contacts," Journal of Tribology, 128(1), pp. 218-220.

[13] Hauk, A., and Weidner, E., 2000, "Thermodynamic and Fluid-Dynamic Properties of Carbon Dioxide with Different Lubricants in Cooling Circuits for Automobile Application," Industrial and Engineering Chemistry Research, 39(12), pp. 4646-4651.

[14] Yokozeki, A., 2007, "Solubility Correlation and Phase Behaviors of Carbon Dioxide and Lubricant Oil Mixtures," Applied Energy, 84(2), pp. 159-75.

[15] Demas, N. G., Polycarpou, A. A., and Conry, T. F., 2005, "Tribological Studies on Scuffing Due to the Influence of Carbon Dioxide Used as a Refrigerant in Compressors," Tribology Transactions, 48(3), pp. 336-342.

[16] Clarens, A. F., Skerlos, S. J., and Hayes, K. F., 2008,

[17] He, M., 2003, "Thermoelastohydrodynamic Analysis of Fluid Film Journal Bearings," Ph.D. thesis, UVA, Charlottesville.

[18] Span, R., and Wagner, W., 1996, "A New Equation of State for Carbon Dioxide Covering the Fluid Region from the Triple-Point Temperature to 1100 K at Pressures up to 800 Mpa," Journal of Physical and Chemical Reference Data, 25(6), pp. 1509-96.

[19] He, M., and Allaire, P. E., 2004, "The Modeling of Leading Edge Groove Tilting Pad Bearings," Tribology Transactions, pp.

[20] He, M., and Allaire, P. E., 2003, "Thermoelastichydrodynamic Analysis of Journal Bearings with 2d Generalized Energy Equation," IFTOMM, eds., Sydney, Australia, pp.

[21] Szeri, A. Z., 1998, Fluid Film Lubrication: Theory and Design, Cambridge University Press, Cambridge; N.Y.

[22] Petroff, N., 1883, "Friction in Machines and the Effect of the Lubricant," Inzhenernii Zhurnal, 1(pp. 71-104.

[23] He, M., and Allaire, P. E., 2002, "Thermoelastohydrodynamic Analysis of Journal Bearings with 2d Generalized Energy Equation," E. J. H. a. R. B. Randall, eds., Sydney, Australia, pp.

[24] Taniguchi, S., Makino, T., Takeshita, K., and Ichimura, T., 1990, "Thermohydrodynamic Analysis of Large Tilting-Pad Journal Bearing in Laminar and Turbulent Flow Regimes with Mixing," Journal of Tribology, 112(3), pp. 542-550.

[25] Fillon, M., Bligoud, J., and Frene, J., 1992, "Experimental Study of Tilting-Pad Journal Bearings—Comparison with Theoretical Thermoelastohydrodynamic Results," Journal of Tribology, 114(pp. 579-587.

[26] Stadler, M. P., Stessman, A. N., and On Jr, F. M., 1992, "Prediction of Co2/Crude Oil Phase Behavior Using Supercritical Fluid Chromatography," eds., Tulsa, Okla., USA, pp. 71-82.

[27] Murphy, W. R., Blain, D. A., and Galiano-Roth, A. S., 2002, "Synthetics Basics Benefits of Synthetic Lubricants in Industrial," Journal of Synthetic Lubrication, 18(4), pp. 301-326.

[28] Clarens, A., 2008, "Carbon Dioxide Based Metalworking Fluids," Ph.D. thesis, University of Michigan, Ann Arbor.

The following patents, applications and publications as listed below and throughout this document are hereby incorporated by reference in their entirety herein.

The devices, systems, compositions, computer program products, and methods of various embodiments of the invention disclosed herein may utilize aspects disclosed in the following references, applications, publications and patents and which are hereby incorporated by reference herein in their entirety:

a. U.S. Patent Application Publication No. US 2008/0293599 A1, Skerlos, et al., "Metalworking Lubricant Formulations Based on Supercritical Carbon Dioxide", Nov. 27, 2008.

b. U.S. Patent Application Publication No. US 2006/0252950 A1, Ginosar, et al., "Production of Biodiesel Using Expanded Gas Solvents", Nov. 9, 2006.

c. Clarens, et al., "Feasibility of Gas-Expanded Lubricants for Increased Energy Efficiency in Tilting-Pad Journal Bearings", J of Tribology, July 2010, Vol. 132, pgs. 031802-8.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary.

Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method of lubricating at least one moving part with a medium, wherein said method comprises:
    delivering the medium to at least one moving part for lubrication, wherein said medium when supplied to at least one moving part for lubrication is comprised of a completely dissolved mixture of a lubricant and a compressed gas.

2. The method of claim 1, wherein at least one moving part is one or more selected from the group consisting of rotor, bearing, or gear.

3. The method of claim 1, wherein said lubricant comprises at least one of: synthetic lubricant, semi-synthetic lubricant, petroleum oil, of refined petroleum oil.

4. The method of claim 3, wherein said synthetic lubricant comprises at least one of the following: Polyalkylene Glycol (PAG), Poly-Alpha Olefin (PAO), Trimethylolpropane (TMP) Ester or other lubricant formulation with good gas solubility.

5. The method of claim 1, wherein said compressed gas is one or more selected from the group consisting of Carbon Dioxide, Nitrogen, Argon, Air, or Helium.

6. The method of claim 1, wherein said dissolved mixture has properties between those of a pure lubricant and a gas.

7. The method of claim 1, wherein said delivery further comprises:
    controlling the supply and the proportion of said lubricant and said compressed gas being transferred to the at least one moving part.

8. The method of claim 1, further comprising:
    providing input conditions for said delivery.

9. The method of claim 8, wherein said input conditions are defined by a user and/or controller in response to some external factor.

10. The method of claim 9, wherein said input conditions are configurable in real time.

11. The method of claim 9, wherein said input conditions are configurable continuously.

12. The method of claim 9, wherein said input conditions are configurable over intervals of time.

13. The method of claim 9, wherein said input conditions are configurable in real time, continuously and over intervals of time.

14. The method of claim 8, wherein said input conditions determine the respective proportions of said lubricant and said gas in forming said dissolved mixture.

15. The method of claim 1, further comprising adding and/or releasing a quantity of said gas from a pressurized chamber to adjust the viscosity, temperature, and thermal conductivity of said mixture.

16. The method of claim 15, wherein said adding and/or releasing comprises venting said gas, thereby decreasing the pressure of said mixture in said pressurized chamber.

17. The method of claim 15, wherein said adding and/or releasing comprises venting said gas, thereby affecting the temperature of said mixture in said pressurized chamber.

18. The method of claim 15, wherein said adding and/or releasing comprises venting said gas, thereby affecting the thermal conductivity of said mixture in said pressurized chamber.

19. The method of claim 1, wherein said moving part is housed in a pressurized chamber, said method further comprising scavenging a quantity of surplus lubricant from said pressurized chamber and returning said lubricant to said lubricant reservoir.

20. A system for lubricating at least one moving part with a medium, wherein said system comprises:
    a pressurized chamber configured to house the at least one moving part;
    a lubricant reservoir configured to house a lubricant; and
    a gas reservoir configured to house a gas, wherein said lubricant reservoir and said gas reservoir are configured to:
        combine said lubricant and said gas into a completely dissolved mixture of said lubricant and said compressed gas to form said medium, and
        deliver said medium while in the completely dissolved mixture of the lubricant and the compressed gas into the pressurized chamber to the at least one moving part while in the completely dissolved mixture of the lubricant and the compressed gas for the lubrication of the at least one moving part.

21. The system of claim 20, wherein at least one moving part is one or more selected from the group consisting of rotor, bearing, or gear.

22. The system of claim 20, wherein said lubricant comprises at least one of:
    synthetic lubricant, semi-synthetic lubricant, petroleum oil, or refined petroleum oil.

23. The system of claim 22, wherein said synthetic lubricant comprises at least one of the following: Polyalkylene Glycol (PAG), Poly-Alpha Olefin (PAO), Trimethylolpropane (TMP) Ester or other lubricant formulation with good gas solubility.

24. The system of claim 20, wherein said gas is one or more selected from the group consisting of Carbon Dioxide, Nitrogen, Argon, Air, or Helium.

25. The system of claim 20, wherein said mixture has properties between those of a pure lubricant and a gas.

26. The system of claim 20, further comprising a controller to allow the transfer of a quantity of said lubricant from said lubricant reservoir and a quantity of said gas from said gas reservoir to said moving part.

27. The system of claim 26, wherein the function of said controller is determined in response to input conditions.

28. The system of claim 27, wherein said input conditions are defined by a user and/or controller in response to some external factor.

29. The system of claim 27, wherein said input conditions are configurable in real time.

30. The system of claim 27, wherein said input conditions are configurable continuously.

31. The system of claim 27, wherein said input conditions are configurable over intervals of time.

32. The system of claim 27, wherein said input conditions are configurable in real time, continuously and over intervals of time.

33. The system of claim 27, wherein said input conditions determine the respective proportions of said lubricant and said gas in forming said dissolved mixture.

34. The system of claim 20, further comprising a gas purge device configured to release gas from said pressurized chamber, thereby decreasing the pressure of said mixture in said pressurized chamber.

35. The system of claim 20, further comprising a gas purge device configured to release gas from said pressurized chamber, thereby affecting the temperature of said mixture in said pressurized chamber.

36. The system of claim 20, further comprising a gas purge device configured to release gas from said pressurized chamber, thereby affecting the thermal conductivity of said mixture in said pressurized chamber.

37. The system as in any one of claim 34, 35, or 36, wherein said gas purge device is one or more selected from the group consisting of valve, vent, or egress.

38. The system of claim 20, further comprising a return channel, said return channel configured to scavenge a quantity of surplus lubricant from said pressurized chamber and return said lubricant to said lubricant reservoir.

39. The system of claim 20, wherein said gas reservoir is configured to add gas to said pressurized chamber, thereby increasing the pressure of said mixture in said pressurized chamber.

40. The system of claim 20, wherein said gas reservoir is configured to add gas to said pressurized chamber, thereby affecting the temperature of said mixture in said pressurized chamber.

41. The system of claim 20, wherein said gas reservoir is configured to add gas to said pressurized chamber, thereby affecting the thermal conductivity of said mixture in said pressurized chamber.

* * * * *